United States Patent
Yoshikawa et al.

(10) Patent No.: US 8,996,927 B2
(45) Date of Patent: Mar. 31, 2015

(54) ELECTRONIC CONTROL DEVICE WITH WATCHDOG TIMER AND PROCESSING UNIT TO DIAGNOSE MALFUNCTION OF WATCHDOG TIMER

(75) Inventors: Taku Yoshikawa, Shioya-gun (JP);
Takeshi Yamada, Shioya-gun (JP);
Shinichi Daibo, Utsunomiya (JP);
Yuichi Kobata, Utsunomiya (JP)

(73) Assignees: Keihin Corporation (JP); Honda Motor Co., Ltd. (JP)

( * ) Notice: Subject to any disclaimer, the term of this patent is extended or adjusted under 35 U.S.C. 154(b) by 224 days.

(21) Appl. No.: 13/613,199

(22) Filed: Sep. 13, 2012

(65) Prior Publication Data

US 2013/0067287 A1    Mar. 14, 2013

(30) Foreign Application Priority Data

Sep. 14, 2011  (JP) ................. 2011-200758

(51) Int. Cl.
*G06F 11/00*    (2006.01)
*G06F 11/07*    (2006.01)
*H02J 7/00*    (2006.01)

(52) U.S. Cl.
CPC ........... *G06F 11/0757* (2013.01); *H02J 7/0029* (2013.01)
USPC ....................................... 714/55

(58) Field of Classification Search
CPC .................................. G06F 11/0757
USPC ........................................... 714/55
See application file for complete search history.

(56) References Cited

U.S. PATENT DOCUMENTS 4,809,280 A * 2/1989 Shonaka .................... 714/55
(Continued)

FOREIGN PATENT DOCUMENTS

CN           1543097 A    11/2004
JP           11167505 A    6/1999
(Continued)

OTHER PUBLICATIONS

Chinese Office Action in reference to Chinese Patent Application No. 201210336791.6; Date of issuance: Jun. 30, 2014: with English translation.

(Continued)

*Primary Examiner* — Philip Guyton
(74) *Attorney, Agent, or Firm* — Cantor Colburn LLP

(57) ABSTRACT

An electronic control device includes: a processing unit that performs a predetermined process in accordance with a program; a watchdog timer that includes a time counter reset by a pulse signal output at a given period from the processing unit and outputs a signal having levels inverted depending on whether an overflow occurs; and a latch circuit that latches the signal output from the watchdog timer and outputs a signal obtained through the latching as a first output enable signal. The processing unit stops the output of the pulse signal, when diagnosing a malfunction of the watchdog timer, and diagnoses the malfunction of the watchdog timer based on the first output enable signal output from the latch circuit, after stopping the output of the pulse signal.

4 Claims, 3 Drawing Sheets

(56) References Cited

U.S. PATENT DOCUMENTS

| | | | |
|---|---|---|---|
| 4,956,842 A * | 9/1990 | Said | 714/815 |
| 5,522,040 A * | 5/1996 | Hofsass et al. | 714/55 |
| 6,076,172 A * | 6/2000 | Kimura et al. | 714/24 |
| 6,883,123 B2 * | 4/2005 | Hashimoto et al. | 714/55 |
| 7,287,198 B2 * | 10/2007 | Foerstner | 714/55 |
| 2012/0011407 A1 * | 1/2012 | Fuchigami | 714/39 |
| 2013/0067287 A1 * | 3/2013 | Yoshikawa et al. | 714/47.1 |
| 2013/0231807 A1 * | 9/2013 | Yoshikawa et al. | 701/22 |

FOREIGN PATENT DOCUMENTS

| | | |
|---|---|---|
| JP | 2003140779 A | 5/2003 |
| JP | 2005-25290 A | 1/2005 |

OTHER PUBLICATIONS

Japanese Notice of Reasons for Rejection corresponding to Application No. 2011-200758; Date of Mailing: Jan. 27, 2015, with English translation.

* cited by examiner

US 8,996,927 B2

ELECTRONIC CONTROL DEVICE WITH WATCHDOG TIMER AND PROCESSING UNIT TO DIAGNOSE MALFUNCTION OF WATCHDOG TIMER

BACKGROUND OF THE INVENTION

1. Field of the Invention

The present invention relates to an electronic control device.

Priority is claimed on Japanese Patent Application No. 2011-200758, filed Sep. 14, 2011, the content of which is incorporated herein by reference.

2. Description of Related Art

In the related art, a WDT (Watchdog Timer) is a well-known hardware timer used to monitor the state of a CPU (Central Processing Unit). When the state of the CPU is updated at a given period by the CPU and the signal is not updated within the given period, the WDT detects a timeout and outputs an abnormality. When the WDT is malfunctioning, an abnormality of the CPU may not be detected. Therefore, there is a concern that system reliability may not be ensured.

JP-A-2005-25290 discloses a technology for diagnosing a malfunction of a WDT by determining whether the WDT performs a reset operation on a CPU when a program-running signal (P-RUN signal) supplied from the CPU to the WDT stops.

SUMMARY OF THE INVENTION

In the technology according to the related art, at a time of the reset operation, the CPU determines whether the WDT performs the reset operation by writing data to an EEPROM before the stoppage of the P-RUN signal and comparing the data written to the EEPROM with ROM data.

That is, in the technology according to the related art, it is necessary to perform the process of writing the data on the EEPROM and comparing the written data with the ROM data in each reset operation in order to diagnose the malfunction of the WDT. Therefore, a problem may arise in that the processing load on the CPU increases.

The invention is devised in light of the above-mentioned circumstances and an object of the invention is to provide an electronic control device capable of diagnosing the malfunction of a WDT without an increase in the processing load on a processing unit such as a CPU to be monitored.

According to an aspect of the invention, an electronic control device is provided.

(A) According to an aspect of the invention, an electronic control device is provided including a processing unit that performs a predetermined process in accordance with a program; a watchdog timer that includes a time counter reset by a pulse signal output at a given period from the processing unit and outputs a signal having levels inverted depending on whether an overflow occurs; and a latch circuit that latches the signal output from the watchdog timer and outputs a signal obtained through the latching as a first output enable signal. The processing unit stops the output of the pulse signal, when diagnosing a malfunction of the watchdog timer, and diagnoses the malfunction of the watchdog timer based on the first output enable signal output from the latch circuit, after stopping the output of the pulse signal.

(B) In the electronic control device according to the aspect in (A), the electronic control device may further include an AND circuit that calculates a logical AND of the first output enable signal output from the latch circuit and a second output enable signal output from the processing unit and outputs a signal indicating the calculation result as a final output enable signal. The processing unit may diagnose the malfunction of the watchdog timer based on the first output enable signal output from the latch circuit and the output enable signal output from the AND circuit, after stopping the output of the pulse signal.

(C) In the electronic control device according to the aspect in (A), the electronic control device may further include an AND circuit that calculates a logical AND of the first output enable signal output from the latch circuit and a second output enable signal output from the processing unit and outputs a signal indicating the calculation result as a final output enable signal; and a three-state buffer that is provided between the processing unit and an output interface and outputs a signal output from the processing unit to the output interface in accordance with the output enable signal output from the AND circuit. The processing unit may diagnose the malfunction of the watchdog timer based on the first output enable signal output from the latch circuit and the output signal output from the three-state buffer, after stopping the output of the pulse signal.

(D) In the electronic control device according to the aspect in any one of (A) to (C), the latch circuit may be reset when any one of an activation ignition signal or a reset signal of the processing unit is input.

According to the aspect of the invention, when a malfunction of the WDT is diagnosed, it is not necessary to perform a process of causing the CPU to write data to an EEPROM before a P-RUN signal stops and to compare the data written on the EEPROM with ROM data, as in the technology according to the related art. Therefore, it is possible to diagnose the malfunction of the WDT without an increase in the processing load on a processing unit such as a CPU to be monitored.

DETAILED DESCRIPTION OF THE INVENTION

Hereinafter, an embodiment of the invention will be described with reference to the drawings.

Figure 1:
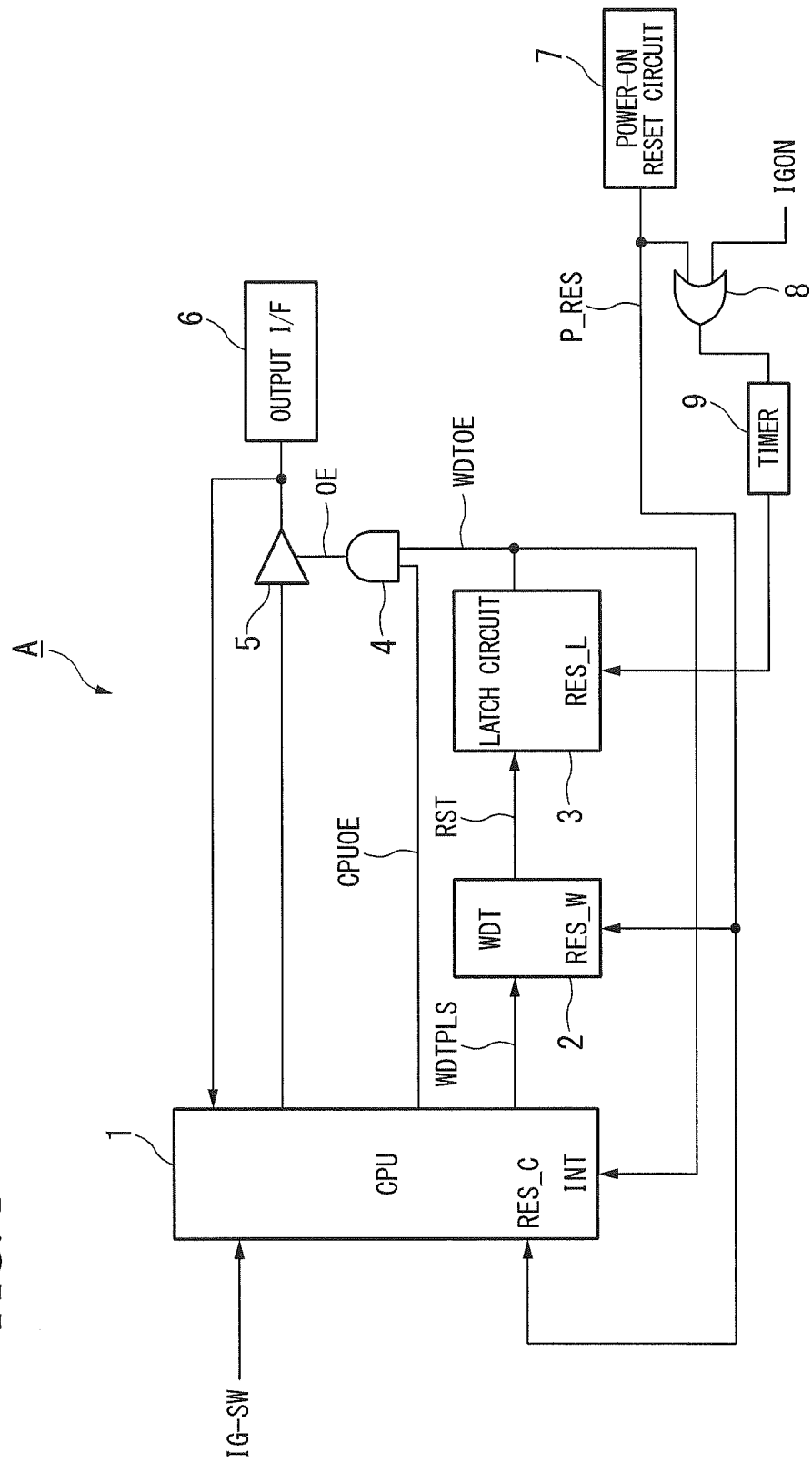
FIG. 1 is a block diagram illustrating an electronic control device according to an embodiment of the invention.

FIG. 1 is a block diagram illustrating an electronic control device A according to this embodiment. The electronic control device A is a battery ECU (Electric Control Unit) that controls charging and discharging of a high-voltage battery mounted on a vehicle using a motor of an electric vehicle, a plug-in hybrid vehicle, or the like as a power source. The electronic control device A includes a CPU 1, a watchdog timer (WDT) 2, a latch circuit 3, an AND circuit 4, a three-state buffer 5, an output interface 6, a power-on reset circuit 7, an OR circuit 8, and a timer 9.

The CPU 1 (processing unit) is a central processing unit that executes a predetermined process (for example, a process necessary for controlling charging or discharging of a high-voltage battery) in accordance with a control program stored in a non-volatile memory (not shown). The CPU 1 outputs a signal obtained through various processes to the output interface 6 via the three-state buffer 5. Further, the CPU 1 outputs a WDT pulse signal WDTPLS to the WDT 2 at a given period and also outputs, to the AND circuit 4, a CPU output enable signal CPUOE (second output enable signal) that has two states: an output prohibition level (for example, a high level) and an output permission level (for example, a low level).

As will be described in detail below, a WDT output enable signal WDTOE output from the latch circuit 3 is input as an interrupt signal to the CPU 1 and an output signal of the three-state buffer 5 is input to the CPU 1. Thus, the CPU 1 diagnoses a malfunction of the WDT 2 based on the interrupt signal (the WDT output enable signal WDTOE) and the output signal of the three-state buffer 5.

Further, the CPU 1 has a function of transitioning to a sleep state, which is a power-saving state. Therefore, the state of the CPU 1 is switched between the sleep state and a normal operation state depending on an activation ignition generation status (a state of an activation ignition signal). For example, an activation ignition signal IG-SW indicating the ON/OFF state of an ignition switch is input as an activation ignition signal from the outside to the CPU 1.

The WDT 2 is a hardware timer that is used to monitor the state of the CPU 1. The WDT 2 includes a time counter that is reset by the WDT pulse signal WDTPLS input at the given period from the CPU 1. The time counter continues counting-up even after the output of the WDT pulse signal WDTPLS from the CPU 1 to the WDT 2 stops, and thus an overflow occurs after a given time passes. The WDT 2 outputs a signal, which has levels inverted depending on whether an overflow occurs, as an overflow reset signal RST to the latch circuit 3. Specifically, when an overflow occurs, the WDT 2 inverts the level of the overflow reset signal RST from a high level to a low level only for a given period.

The latch circuit 3 latches the overflow reset signal RST output from the WDT 2 and outputs a signal obtained through the latching process as a WDT output enable signal WDTOE (first output enable signal) to an interrupt terminal INT of the CPU 1 and the AND circuit 4. Further, the WDT output enable signal WDTOE is a signal that has two states: an output prohibition level (for example, a high level) and an output permission level (for example, a low level), as in the CPU output enable signal CPUOE.

The AND circuit 4 calculates a logical AND of the WDT output enable signal WDTOE input from the latch circuit 3 and the CPU output enable signal CPUOE input from the CPU 1, and then outputs a signal indicating the calculation result as a final output enable signal OE to a control terminal of the three-state buffer 5. The three-state buffer 5 is provided between the CPU 1 and the output interface 6. The three-state buffer 5 outputs an output signal input from the CPU 1 to the output interface 6 in accordance with the output enable signal OE input from the AND circuit 4 to the control terminal.

Specifically, when the output enable signal OE has an output permission level, the three-state buffer 5 outputs the output signal of the CPU 1 to the output interface 6 without change. When the output enable signal OE has an output prohibition level, the output terminal is set to a high impedance state to stop the output. That is, when the output enable signal OE has the output permission level, the output signal of the three-state buffer 5 also becomes an output permission level. When the output enable signal OE has the output prohibition level, the output signal of the three-state buffer 5 also becomes an output prohibition level.

The output interface 6 is a communication interface that transmits the output signal (the output signal of the three-state buffer 5) of the CPU 1 to an external device connected to the electronic control device A in accordance with a predetermined communication protocol. When power is input to the electronic control device A, the power-on reset circuit 7 outputs, to a reset terminal RES_C of the CPU 1, a reset terminal RES_W of the WDT 2, and the OR circuit 8, a power-on reset signal P_RES that becomes a low level until a power voltage VBU reaches a specified voltage VBU_th at which the normal operation of the CPU 1 is ensured and becomes a high level after the power voltage VBU reaches the specified voltage VBU_th.

That is, when power is input to the electronic control device A, the reset states of the CPU 1 and the WDT 2 are maintained until the power voltage VBU reaches the specified voltage VBU_th.

The OR circuit 8 calculates a logical OR of the power-on reset signal P_RES input from the power-on reset circuit 7 and the activation ignition signal (ignition-on signal IGON) input from the outside, and then outputs a signal indicating the calculation result to a reset terminal RES_L of the latch circuit 3 via the timer 9. The timer 9 delays the output signal of the OR circuit 8 by a given time and outputs the delayed output signal to the reset terminal RES_L of the latch circuit 3.

That is, the latch circuit 3 is reset when any one of the activation ignition signal IG-SW of the CPU 1 and the power-on reset signal P_RES is input, and the resetting of the latch circuit 3 is cancelled later than the CPU 1 and the WDT 2 by a given time.

Next, an operation of the electronic control device A with the above-described configuration will be described in detail with reference to FIGS. 2 and 3.

Figure 2:
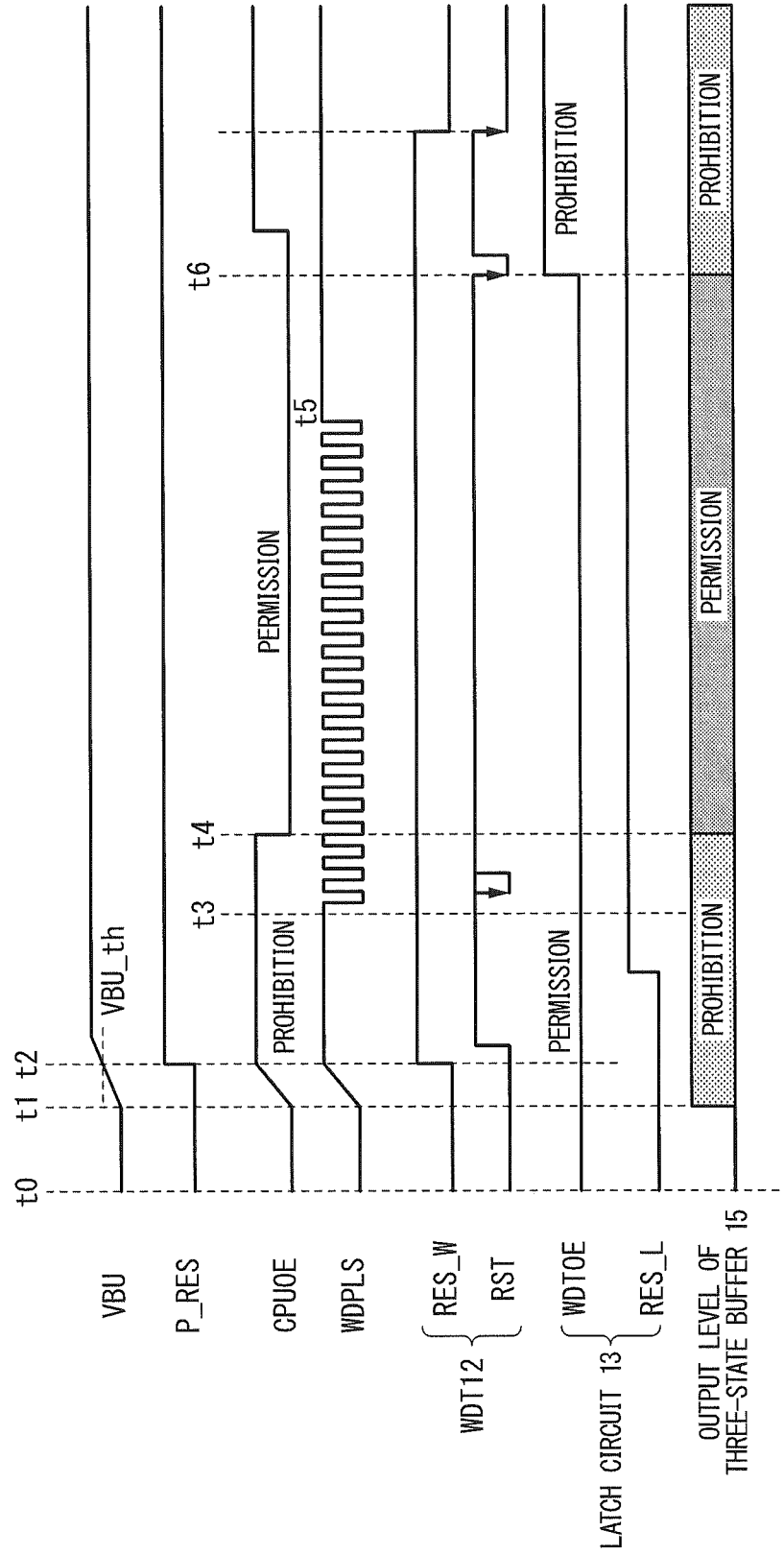
FIG. 2 is a timing chart illustrating a process of the electronic control device.

FIG. 2 is a timing chart illustrating a temporal correspondence relationship among the power voltage VBU, the power-on reset signal P_RES, the CPU output enable signal CPUOE, the WDT pulse signal WDTPLS, the potential of the reset terminal RES_W of the WDT 2, the overflow reset signal RST, the WDT output enable signal WDTOE, the potential of the reset terminal RES_L of the latch circuit 3, and an output level of the three-state buffer 5.

During a period from time t0 to time t1 of FIG. 2, it is assumed that the power voltage VBU is not supplied to the electronic control device A and the CPU 1 is in the sleep state. Here, when power is input at time t1, the power voltage VBU gradually increases up to the maximum voltage for a given time. When the power is input by an operation of turning on the ignition switch, the activation ignition signal IG-SW starts rising toward a high level from time t1. However, the power-on reset signal P_RES maintains the low level until time t2 when the power voltage VBU reaches the specified voltage VBU_th. Therefore, the state of the CPU 1 is maintained at the reset state from time t1 to time t2.

Since both the potential of the reset terminal RES_W of the WDT 2 and the potential of the reset terminal RES_L of the latch circuit 3 are maintained at the low level during a period from time t1 to time t2, the time counter of the WDT 2 is reset and the latch circuit 3 is reset.

When the power voltage VBU reaches the specified voltage VBU_th at time t2, the power-on reset signal P_RES is inverted to the high level. Thus, the resetting of the CPU 1 and the WDT 2 is cancelled. Further, the resetting of the latch circuit 3 is cancelled later than the CPU 1 and the WDT 2 by a given time (see the potential of the reset terminal RES_L of the latch circuit 3).

When the resetting is cancelled at time t2, the CPU 1 is activated from the sleep state and starts outputting the WDT pulse signal WDTPLS to the WDT 2 at the given period from time t3. After time t2, the CPU 1 inverts the CPU output enable signal CPUOE set to the output prohibition level (high level) to the output permission level (low level) from time t4 later than time t3.

After time t3, the time counter of the WDT 2 is normally reset during the continuous output of the WDT pulse signal WDTPLS to the WDT 2, and thus the overflow does not occur. Therefore, the overflow reset signal RST output from the WDT 2 is maintained at the high level. Meanwhile, the WDT output enable signal WDTOE output from the latch circuit 3 is maintained at the output permission level (low level).

That is, after time t4, since both the CPU output enable signal CPUOE output from the CPU 1 and the WDT output enable signal WDTOE output from the latch circuit 3 become the output permission level, the output enable signal OE output from the AND circuit 4 becomes the output permission level. As a result, the output level of the three-state buffer 5 also becomes the output permission level.

In the normal operation, the CPU 1 continues outputting the WDT pulse signal WDTPLS to the WDT 2, as long as the WDT 2 is malfunctioning. Thus, since the output level of the three-state buffer 5 is maintained at the output permission level, as described above, signals obtained through various processes of the CPU 1 in accordance with a control program can be output to an external device via the output interface 6 without a problem.

Here, it is assumed that runaway occurs in the CPU 1 and the output of the WDT pulse signal WDTPLS to the WDT 2 stops after time t5. The time counter of the WDT 2 continues to count up even after the output of the WDT pulse signal WDTPLS stops, and thus an overflow occurs after a given time passes. When the overflow occurs at time t6, the WDT 2 inverts the level of the overflow reset signal RST from the high level to the low level at time t6 only for a given time.

Then, the latch circuit 3 latches the overflow reset signal RST using a change in the level of the overflow reset signal RST as a trigger, as described above. Thus, after time t6, the level of the WDT output enable signal WDTOE output from the latch circuit 3 is inverted to the output prohibition level (high level). Since the WDT output enable signal WDTOE is input to the interrupt terminal INT of the CPU 1, the CPU 1 determines whether the overflow of the WDT 2 occurs based on the WDT output enable signal WDTOE input to the interrupt terminal INT.

When the CPU 1 determines that the overflow of the WDT 2 occurs based on the WDT output enable signal WDTOE, the CPU 1 inverts the level of the CPU output enable signal CPUOE to the output prohibition level (high level). Thus, after time t6, since both the CPU output enable signal CPUOE output from the CPU 1 and the WDT output enable signal WDTOE output from the latch circuit 3 reach the output prohibition level, the output enable signal OE output from the AND circuit 4 becomes the output prohibition level. As a result, the output level of the three-state buffer 5 also becomes the output prohibition level.

That is, when runaway occurs in the CPU 1, transmission of a signal from the three-state buffer 5 to the output interface 6 is blocked. Therefore, an abnormal signal can be prevented from outputting to an external device via the output interface 6.

Thus, when the WDT 2 is normal and the output of the WDT pulse signal WDTPLS from the CPU 1 to the WDT 2 stops, the WDT output enable signal WDTOE, the CPU output enable signal CPUOE, the output enable signal OE, and the output level of the three-state buffer 5 all become the output prohibition level. Accordingly, the malfunction of the WDT 2 can be diagnosed in accordance with a method to be described below.

Figure 3:
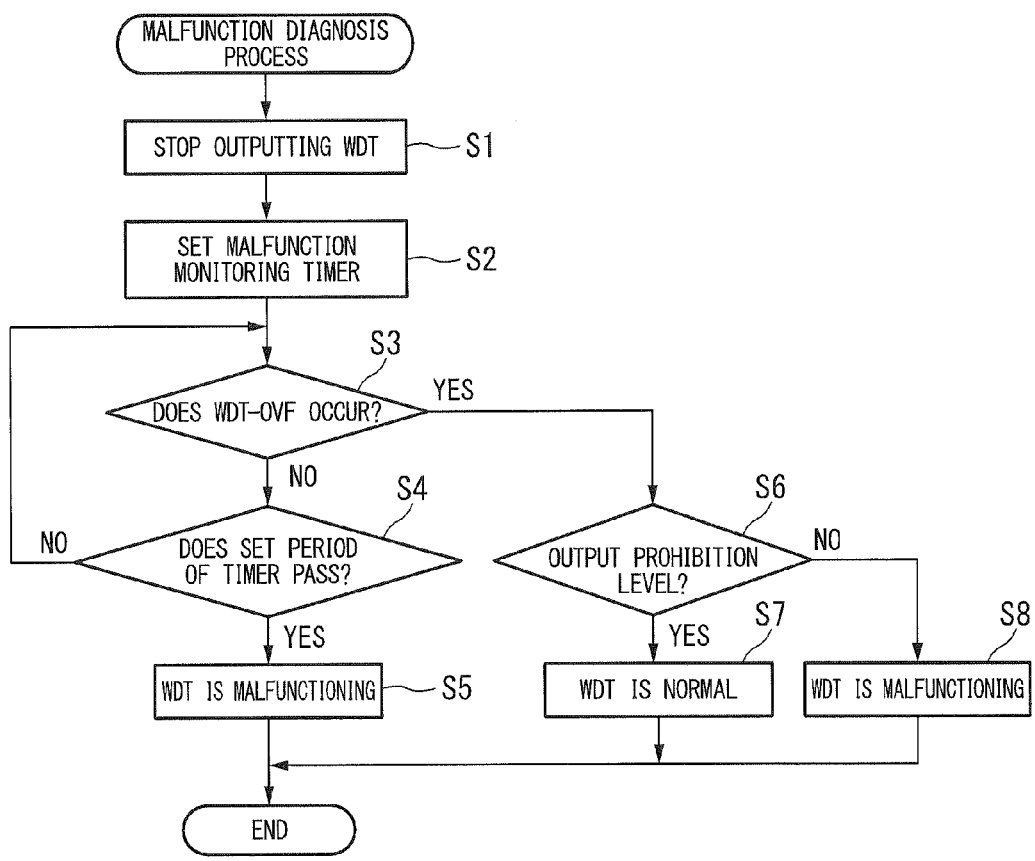
FIG. 3 is a flowchart illustrating a malfunction diagnosis process of a WDT performed by a CPU.

FIG. 3 is a flowchart illustrating a process of diagnosing the malfunction of the WDT 2 performed during the normal operation of the CPU 1 (during a period after time t2 of FIG. 2).

As shown in FIG. 3, when an execution timing of a malfunction diagnosis process starts, the CPU 1 stops outputting the WDT pulse signal WDTPLS to the WDT 2 (step S1) and sets a malfunction monitoring timer which is a software timer (step S2). Here, the set period of the malfunction monitoring timer is preferably at least the period from time t5 to time t6 in FIG. 2, that is, a period from the stoppage of the output of the WDT pulse signal WDTPLS to the WDT 2 to the occurrence of the overflow in the WDT 2.

Then, the CPU 1 determines whether the overflow occurs in the WDT 2 from the level of the WDT output enable signal WDTOE input to the interrupt terminal INT (step S3). When the result of step S3 is "No" (when the CPU 1 determines that the WDT output enable signal WDTOE is the output permission level and the overflow does not occur), the CPU 1 determines whether the set period of the malfunction monitoring timer passes (step S4).

When the result of step S4 is "No", the malfunction diagnosis returns to the process of step S3. Conversely, when the result of step S4 is "Yes", that is, in spite of the elapse of the set period in the malfunction monitoring timer and the stoppage of the output of the WDT pulse signal WDTPLS to the WDT 2, the overflow does not occur, the CPU 1 determines that the WDT 2 is malfunctioning and terminates the malfunction diagnosis process (step S5).

When the result of step S3 is "Yes", that is, the overflow occurs within the set period of the malfunction monitoring timer after the stoppage of the output of the WDT pulse signal WDTPLS, the CPU 1 determines whether the output level of the three-state buffer 5 is the output prohibition level (step S6). When the WDT 2 is normal, as described above, the output level of the three-state buffer 5 should be the output prohibition level after the stoppage of the output of the WDT pulse signal WDTPLS.

Thus, when the result of step S6 is "Yes" (when the output level of the three-state buffer 5 is the output prohibition level), the CPU 1 determines that the WDT 2 is normal and terminates the malfunction diagnosis process (step S7). Conversely, when the result of step S6 is "No" (when the output level of the three-state buffer 5 is the output permission level), the CPU 1 determines that the WDT 2 is malfunctioning and terminates the malfunction diagnosis process (step S8).

According to this embodiment, as described above, it is determined whether the overflow occurs within the specified period (within the set period of the malfunction monitoring timer) after the output of the WDT pulse signal WDTPLS to the WDT 2 stops. Even when the overflow occurs, it is determined whether the output level of the three-state buffer 5 is the output prohibition level. Then, the malfunction of the WDT 2 can be diagnosed. Therefore, compared with the technology according to the related art, the malfunction of the WDT 2 can be diagnosed simply without an increase in the processing load on the CPU 1 to be monitored.

The invention is not limited to the above-described embodiment, but may be modified in the following various forms.

(1) In the above-described embodiment, the case has been described in which it is determined whether the output level of the three-state buffer 5 is the output prohibition level in the process of step S6 in FIG. 3. However, as described above, when the WDT 2 is normal, the output enable signal OE output from the AND circuit 4 is also the output prohibition level. Therefore, in step S6, it may be determined whether the output enable signal OE is the output prohibition level.

(2) In the above-described embodiment, the diagnosis of the malfunction of the WDT 2 is performed by determining whether or not the overflow occurs within the specified period after the stoppage of the output of the WDT pulse signal WDTPLS to the WDT 2 and by determining whether or not the output level of the three-state buffer 5 is the output prohibition level even when the overflow occurs. However, the diagnosis of the malfunction of the WDT 2 may be performed by determining whether the overflow occurs within the specified period after the stoppage of the output of the WDT pulse signal WDTPLS to the WDT 2 in order to diagnose the malfunction of the WDT 2.

In this case, when the overflow occurs within the specified period after the stoppage of the output of the WDT pulse signal WDTPLS to the WDT 2, it may be determined that the WDT 2 is normal. When the overflow does not occur within the specified period, it may be determined that the WDT 2 is malfunctioning.

(3) In the above-described embodiment, the battery ECU controlling charging and discharging of a high-voltage battery mounted in a vehicle such as an electric vehicle and a plug-in hybrid vehicle which use a motor as a driving power has been exemplified as the electronic control device A. However, the invention is not limited thereto. The invention is broadly applicable to an electronic control device including a processing unit that performs a predetermined process in accordance with a program and a watchdog timer that includes a time counter reset by a pulse signal output at a given period from the processing unit and outputs a signal having levels inverted depending on whether an overflow occurs.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims

What is claimed is:

1. An electronic control device comprising:
   a processing unit that performs a predetermined process in accordance with a program;
   a watchdog timer that includes a time counter reset by a pulse signal output at a given period from the processing unit and outputs a signal having levels inverted depending on whether an overflow occurs;
   a latch circuit that latches the signal output from the watchdog timer and outputs a signal obtained through the latching as a first output enable signal; and
   an AND circuit that calculates a logical AND of the first output enable signal output from the latch circuit and a second output enable signal output from the processing unit and outputs a signal indicating the calculation result as a final output enable signal,
   wherein the processing unit stops the output of the pulse signal, when diagnosing a malfunction of the watchdog timer, and diagnoses the malfunction of the watchdog timer based on the first output enable signal output from the latch circuit and the final output enable signal output from the AND circuit, after stopping the output of the pulse signal.

2. The electronic control device according to claim 1, wherein the latch circuit is reset when any one of an activation ignition signal or a reset signal of the processing unit is input.

3. An electronic control device comprising:
   a processing unit that performs a predetermined process in accordance with a program;
   a watchdog timer that includes a time counter reset by a pulse signal output at a given period from the processing unit and outputs a signal having levels inverted depending on whether an overflow occurs;
   a latch circuit that latches the signal output from the watchdog timer and outputs a signal obtained through the latching as a first output enable signal;
   an AND circuit that calculates a logical AND of the first output enable signal output from the latch circuit and a second output enable signal output from the processing unit and outputs a signal indicating the calculation result as a final output enable signal; and
   a three-state buffer that is provided between the processing unit and an output interface and outputs a signal output from the processing unit to the output interface in accordance with the final output enable signal output from the AND circuit,
   wherein the processing unit stops the output of the pulse signal, when diagnosing a malfunction of the watchdog timer, and diagnoses the malfunction of the watchdog timer based on the first output enable signal output from the latch circuit and the output signal output from the three-state buffer, after stopping the output of the pulse signal.

4. The electronic control device according to claim 3, wherein the latch circuit is reset when any one of an activation ignition signal or a reset signal of the processing unit is input.

* * * * *